US011997418B2

(12) United States Patent
Lang et al.

(10) Patent No.: US 11,997,418 B2
(45) Date of Patent: May 28, 2024

(54) INDIRECT VIEWING SYSTEM AND METHOD FOR ADJUSTING A FRAME RATE

(71) Applicant: MEKRA Lang GmbH & Co. KG, Ergersheim (DE)

(72) Inventors: Werner Lang, Ergersheim (DE); Peter Geißendörfer, Arberg (DE); Andreas Redlingshöfer, Trautskirchen (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 2 days.

(21) Appl. No.: 17/522,231

(22) Filed: Nov. 9, 2021

(65) Prior Publication Data
US 2022/0150443 A1 May 12, 2022

(30) Foreign Application Priority Data

Nov. 12, 2020 (DE) ...................... 10 2020 129 908.7

(51) Int. Cl.
*H04N 7/01* (2006.01)
*B60R 1/00* (2022.01)
*H04N 7/18* (2006.01)
*H04N 23/76* (2023.01)

(52) U.S. Cl.
CPC ............. *H04N 7/0127* (2013.01); *B60R 1/00* (2013.01); *H04N 7/183* (2013.01); *H04N 23/76* (2023.01); *B60R 2300/303* (2013.01)

(58) Field of Classification Search
CPC ...... H04N 7/0127; H04N 7/183; H04N 23/76; H04N 7/181; H04N 23/80; H04N 5/77; H04N 23/54; B60R 1/00; B60R 2300/303

USPC .......................................... 348/148; 375/240
See application file for complete search history.

(56) References Cited

U.S. PATENT DOCUMENTS

| 2008/0170161 A1 | 7/2008 | Nakajima |
| 2011/0109796 A1 | 5/2011 | Subedar et al. |
| 2012/0050074 A1* | 3/2012 | Bechtel ............... G06V 10/143 382/104 |
| 2015/0294479 A1 | 10/2015 | Beric et al. |

(Continued)

FOREIGN PATENT DOCUMENTS

| EP | 2 377 725 | 10/2011 |
| EP | 3200449 | 8/2017 |

(Continued)

OTHER PUBLICATIONS

Isberg et al., "Frame rate up-conversion of real-time high-definition remote surveillance video," Apr. 30, 2012, pp. 1-90.

(Continued)

*Primary Examiner* — Susan E. Torgerson
(74) *Attorney, Agent, or Firm* — Cozen O'Connor

(57) ABSTRACT

An indirect viewing system for a vehicle has at least one image capture device (2) having an image sensor (3) for continuously taking images at a first frame rate, an image memory (4) that temporarily stores images for processing that is temporally after the images are captured, and an image processing device (6) adapted to continuously compute at least one new image from at least two successively taken images, the computed new images having a second frame rate different from the first frame rate, and an image output device (5) for outputting the continuously computed new images at the second frame rate.

18 Claims, 9 Drawing Sheets

(56) References Cited

U.S. PATENT DOCUMENTS

| | | | |
|---|---|---|---|
| 2016/0353054 A1* | 12/2016 | Gilmutdinov | H04N 7/0127 |
| 2017/0225621 A1* | 8/2017 | Shiohara | H04N 5/247 |
| 2017/0291550 A1 | 10/2017 | Sasaguchi et al. | |
| 2018/0091768 A1 | 3/2018 | Adsumilli | |
| 2021/0044777 A1* | 2/2021 | Zheng | G09G 5/005 |

FOREIGN PATENT DOCUMENTS

| | | |
|---|---|---|
| JP | H 04-74082 | 3/1992 |
| JP | H 05-336499 | 12/1993 |
| JP | 2005/184395 | 7/2005 |
| JP | 2006-081047 | 3/2006 |
| JP | 2007-251254 | 9/2007 |
| JP | 64-47886 B2 | 1/2019 |
| WO | WO 2016/047087 | 3/2016 |

OTHER PUBLICATIONS

Office Action dated Dec. 20, 2022 issued in Japanese Patent Application No. 2021-178423.
Office Action dated Aug. 22, 2023 issued in Korean Patent Application No. 10-2021-0155276.
Reconsideration Report dated Jan. 18, 2024 issued in Japanese Patent Application No. 2021-178423.

* cited by examiner

INDIRECT VIEWING SYSTEM AND METHOD FOR ADJUSTING A FRAME RATE

BACKGROUND OF THE INVENTION

1. Field of the Invention

The present invention relates to an indirect viewing system, which can be used in particular as a mirror replacement system (mirror substitute system) according to UN/ECE-R46 for a vehicle, and to a method for adjusting a frame repetition rate (refresh rate) of images acquired by an image sensor of an image acquisition device of the viewing system.

2. Description of the Related Art

For camera systems or mirror replacement systems (according to UN/ECE-R46), vehicle manufacturers require a refresh rate of 60 Hz or frames per second (fps). The LCD panels installed in monitors are already available with more than 60 fps as standard. One problem, however, is that the camera used in the mirror replacement system comprises image sensors installed as standard that can only output their full resolution with simultaneous full dynamic range at less than 60 fps. However, in order to comply with the legal requirements for a mirror substitute system according to UN/ECE-R46, a higher dynamic range is required at the same time as high resolution.

The use of an LCD panel with a standard refresh rate of 60 fps, for example, and the simultaneous use of a standard image sensor, which as described above do not match in terms of their refresh rates, results in the problem that these two components cannot be operated together without further technical measures.

According to the state of the art, the above problem is solved by using special, high-priced image sensors that enable high resolution with full dynamic range and a refresh rate of, for example, 60 fps.

Alternatively, according to the prior art, a standard available image sensor with a frame rate of less than 60 fps is used and the frame rate is increased from, for example, 30 fps to 60 fps computationally by a processing unit of the camera system by outputting each image frame twice in succession on the monitor. According to the prior art, a computational increase of the frame rate from, for example, 40 fps to 60 fps can be performed by outputting every second image frame twice in succession on the monitor.

One disadvantage of the above-mentioned known techniques for adapting the refresh rate of the image sensor to the refresh rate of the LCD panel is that the image impression for the vehicle driver corresponds to that of a 30 fps or 40 fps camera system, and thus appears less "smooth" or "faltering", making it more difficult to assess high relative speeds between the vehicle itself and other road users. However, the relative speeds are lower for mirror replacement systems according to UN/ECE-R46 of groups I-IV than for mirror replacement systems of groups V and VI, rear view cameras or surround view (bird's eye) systems, due to the image perspective of the representation of the image content when using the systems.

SUMMARY OF THE INVENTION

An object of the invention is to provide a camera system for a vehicle as well as a method, which adapt the frame rate of an image sensor to the frame rate of a display panel (LCD panel, OLED panel, LED panel, etc.) and at the same time give the vehicle driver the impression of a smooth, non-faltering image sequence.

The above task is solved by an indirect viewing system for a vehicle having the features of claim 1 and by a method according to the features of claim 11. Preferred embodiments are given in the dependent claims.

The indirect viewing system for a vehicle according to the invention comprises at least one image acquisition device comprising an image sensor for continuously acquiring images at a first frame rate corresponding to the frame rate of the image sensor. Standard image sensors used in automotive applications typically have a refresh rate of less than 60 fps. This low frame rate means that less data needs to be transmitted within the system, allowing the use of lower cost components.

In accordance with the invention, images captured by the image capture device are temporarily stored in an image memory for further processing of the images in time after the images are captured. According to the present invention, this further processing is carried out in such a way that the refresh rate of the image sensor is adapted to a desired refresh rate of 60 fps, in this case prescribed by the vehicle manufacturer, in order to be able to display, for the human eye, a smooth motion sequence on an image output device with a refresh rate of 60 fps despite the low refresh rate of the image sensor.

According to the invention, the processing of the images temporarily stored in the image memory is performed by an image processing device which continuously calculates at least one new image from at least two consecutively captured images. As a result of the calculation, the newly calculated images have a second frame rate that is higher than the first frame rate at which the images were captured. For example, the first frame rate is at 40 fps, and the second frame rate is at 60 fps. However, according to the invention, any number of frame rates can be adjusted to any number of higher or lower frame rates. This makes it possible to combine more different image sensors with different LCD panels, thereby increasing the number of technical solutions and providing cost advantages.

Finally, according to the present invention, the indirect viewing system comprises an image output device capable of outputting images at the second high refresh rate (60 fps). Specifically, the image output device outputs the images continuously recalculated by the image processing device at the adapted refresh rate of the image sensor.

The continuous recalculation of new images in the image processing device, as described above, is specifically performed by summing two successive images, each multiplied by a percentage factor, to produce a recalculated image. Thereby, the percentage factor corresponds to a temporal position of the recalculated image with respect to the temporal position of the underlying at least two successively acquired images.

According to the invention, the above-mentioned percentage factors depend in particular on the image refresh rate of the image capturing device or the image sensor and the image refresh rate of the image output device. These percentage factors may be predetermined and stored in a memory or calculated by the image processing device at system run time.

According to the present invention, in generating a new image, specifically brightness information and/or color information of each pixel in a captured image is multiplied by a corresponding percentage factor, and respective pixels corresponding to each other in the at least two successively captured images are summed to generate the new image. In contrast to the generally known frame rate interpolation, no sequence of successive images is analyzed and an attempt is made to find identical or related image parts in order to determine motion vectors, which can then be used to reconstruct the position of an object at the desired point in time between two successive images. By using only the brightness information and/or only the color information without taking motion vectors into account, the computational effort for generating a new image is reduced. In this case, the generation of so-called "ghost images" is accepted, since these do not impair the impression of a smooth motion sequence for the human eye.

Alternatively, according to the present invention, the brightness information and/or color information of each pixel of captured images may not be used in the calculation of a new image, but the brightness information and/or color information of the raw data of the image sensor itself.

As mentioned above, to generate a new image, at least two successively captured images are multiplied by a corresponding percentage factor and the resulting images are summed. In this case, the percentage factor corresponds to the temporal position of the newly calculated image with respect to the temporal position of the at least two consecutively acquired images. Preferably according to the invention, the percentage factors may be stored as constants in the image processing device. In particular, a grid for the factor determination (determination of the percentage factors) can be stored in a memory, wherein the grid for the factor determination depends on the image refresh rate of the image capturing device and the image refresh rate of the image output device, i.e. on a (first) image refresh rate of the image sensor to be adapted to the (second) image refresh rate of the image output device.

According to the present invention, the above-mentioned predetermined grid for factor determination may have a so-called initial phase offset between the first and second image refresh rates, so that the percentage factors depend not only on the image refresh rate of the image capturing device and the image refresh rate of the image output device, but also on this initial phase offset between the first and second image refresh rates. By additionally using the initial phase offset, as many new images as possible can be calculated, of which as few as possible correspond to originally acquired images.

In accordance with the present invention, for example, the sum of the percentage factors by which two successive images are multiplied may be equal to 100%. If the sum is greater than 100%, image brightening occurs, whereas if the sum is less than 100%, image darkening occurs in the new image generated from these two successive images.

According to the present invention, the image refresh rate of the image capture device is lower than the image refresh rate of the image output device, and both image refresh rates may be static or fixed, so that they do not change during operation of the system. Alternatively, it is possible that the image refresh rate of the image capture device changes dynamically as a function of vehicle states, for example speed, forward and reverse travel, standstill, parking process, maneuvering process, turning process, etc., as a function of vehicle signals, for example turn signals, reverse gear, brightness sensors, acceleration sensors, etc., as a function of a manual input by a user, for example pressing a button, etc., and/or as a function of signals from the indirect viewing system itself, for example a brightness detected by the image capture device via the image sensor, by a brightness sensor in the image output device, etc. By dynamically changing the frame rate, in particular by reducing the frame rate when the environment is dark, the exposure time of the image sensor can be extended, thereby achieving higher sensitivity and thus better visibility in dark environments.

According to the present invention, for example, the image processing device is integrally formed in the image capture device or in the image output device, and the intermediate image memory is integrally formed in the image processing device.

It should also be mentioned that according to the invention, no more than 200 ms should elapse from the time of capturing the first image of the least two successive images, and displaying the newly calculated image therefrom to the driver.

In the method for adapting an image frame rate according to the invention, there is a continuous acquiring (capturing) of images at the image frame rate of the image sensor of the image capture device, an intermediate storage (cash storing) of the acquired images for a processing lying in time after the acquiring of the images, a continuous calculation of at least one new image from at least two successively acquired images, wherein the newly calculated images have the image frame rate of the image output device; and outputting the continuously recomputed images at the frame rate of the image output device.

Specifically, in the method according to the invention, calculating the at least one new image is performed by forming a sum of at least two successive images each multiplied by a percentage factor, the percentage factor corresponding to the temporal position of the newly calculated image with respect to the temporal position of the at least two successively acquired images.

Further according to the method of the present invention, multiplying brightness information and/or color information of each pixel in a captured image is performed separately or combined with a corresponding percentage factor, and then summing respective corresponding pixels in the at least two successively captured images to generate the new image. Alternatively, according to the method of the invention, multiplying a brightness information and/or color information of the raw data of the image sensor may be performed separately or combined with a corresponding percentage factor, and then summing the respective results in the at least two consecutively captured images to generate the new image. In particular, the percentage factors in the method according to the invention depend on the frame rate of the image capturing device and the frame rate of the image output device. Similarly to the system according to the invention, in the method according to the invention, the percentage factors may depend not only on the frame rates of the image capturing device and the image output device, but additionally on an initial phase offset between the frame rates.

According to the method of the invention, the percentage factors may be stored as constants in the image processing device or calculated at runtime by the image processing device.

According to the method of the invention, the sum of the percentage factors by which at least two successive images are multiplied may be equal to 100%, or greater than 100% in the case of image brightening or less than 100% in the case of image darkening of the newly generated image.

In the method according to the invention, the frame rate of the image capture device and the frame rate of the image output device may be static and not change during operation. Alternatively, the image repetition rate of the image capture device may change dynamically in response to vehicle conditions, vehicle signals, manual input by the user, and/or signals from a brightness sensor of the image capture device and/or signals from a brightness sensor of the image output device, similar to the above system of the invention.

Further, in the method according to the invention, the image processing device may be integrated in the image capture device or the image output device, and/or the image memory may be integrated in the image processing device, similar to the above system according to the present invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, preferred embodiments of the invention will be described with reference to the accompanying figures. Identical reference signs denote identical components. It shows.

DETAILED DESCRIPTION OF THE PRESENTLY PREFERRED EMBODIMENTS

Figure 1:
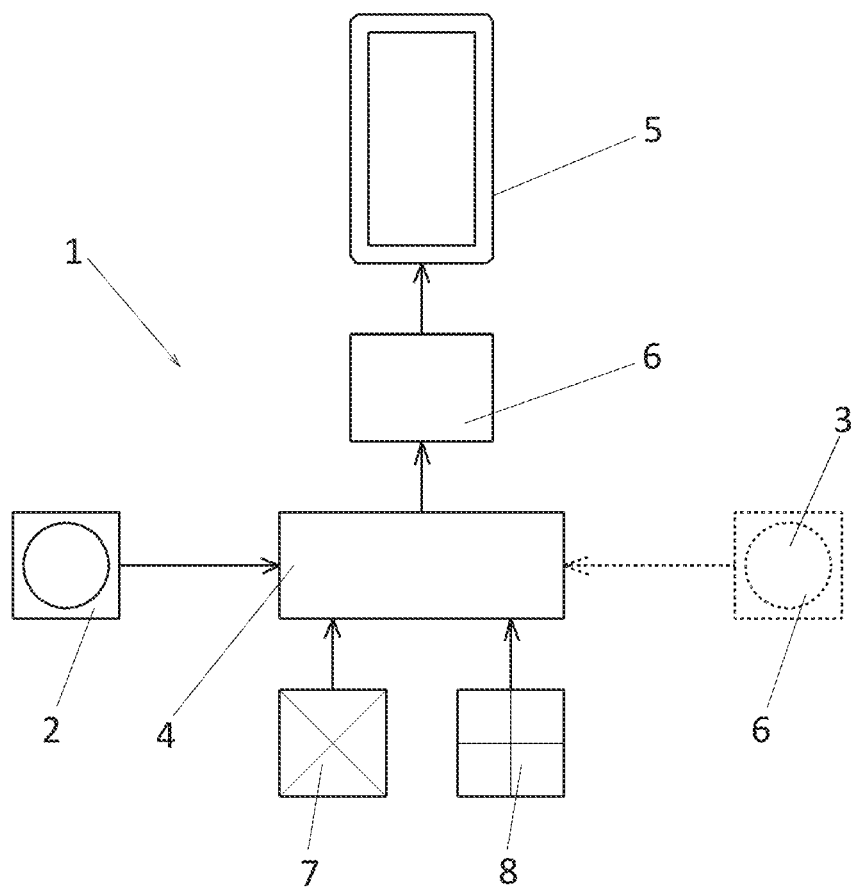
FIG. 1 a schematic view of an indirect viewing system according to an embodiment of the present invention.

FIG. 1 shows a schematic block diagram of an indirect viewing system for a vehicle according to a preferred embodiment of the invention.

The indirect viewing system 1 has two image capture devices 2, each having an image sensor 3 for continuously acquiring images at a first frame rate corresponding to the frame rate of the respective image sensor. Only one or also several image output devices may be present. In the following, only the image output device 2 shown on the left in the figure will be described. In the preferred embodiment, the frame rate of the image sensor 3 is, for example, equal to 45 frames per second (fps) or 50 fps.

As shown in FIG. 1, the image capture device 2 is connected to an image memory 4 that temporarily stores the images captured by the image capture devices 2. The images captured by the image capturing devices 2 are continuously acquired images that are displayed to a driver of the vehicle in near real time on an image output device 5. The images acquired by the image capture device 2 can also remain permanently stored in the image memory 4 for later use in an accident analysis, in the investigation of property damage, etc.

The viewing system 1 further comprises an image processing device 6, which is connected to the image memory 4 and uses the captured images stored in the image memory 4 for a continuous calculation of at least one new image from at least two successively captured images stored in the image memory 4. The image processing device 6 is shown in FIG. 1 as a separate component, but may also be integrated in the image memory 4, or the image memory 4 may be integrated in the image processing device 6.

As shown in FIG. 1, the image processing device 6 is further connected to the image output device 5 to display the images recomputed in the image processing device 6 on the image output device 5 at a higher frame rate than the image sensor 3 of the image capture device 2 can pick up. The calculation process performed in the image processing device 6 to calculate a new image from at least two successively acquired images will be described in more detail later.

FIG. 1 further shows a first sensor 7 and a second sensor 8, each of which is connected to the image storage device 4. The first sensor 7 and the second sensor 8 can alternatively also be connected to the image processing device 6 and/or the image capture device 2. For example, the first sensor 7 detects vehicle conditions, such as speed, forward and reverse, stationary, parking, maneuvering, turning, etc., and the second sensor 8 detects vehicle signals, such as turn signal, reverse gear, brightness sensor, acceleration sensor. The first and second sensors 7, 8 may also additionally or alternatively detect a manual input from a driver or a brightness detected via the image sensor 3 of the image capture device 2, respectively, to dynamically adjust the image frame rate of the image capture device 2 depending on the signals detected by the first and second sensors 7, 8. For example, by reducing the frame rate of the image sensor 3 in a dark environment, the exposure time of the image sensor 3 can be extended, thereby achieving higher sensitivity and thus better visibility in dark environment.

Figure 2:
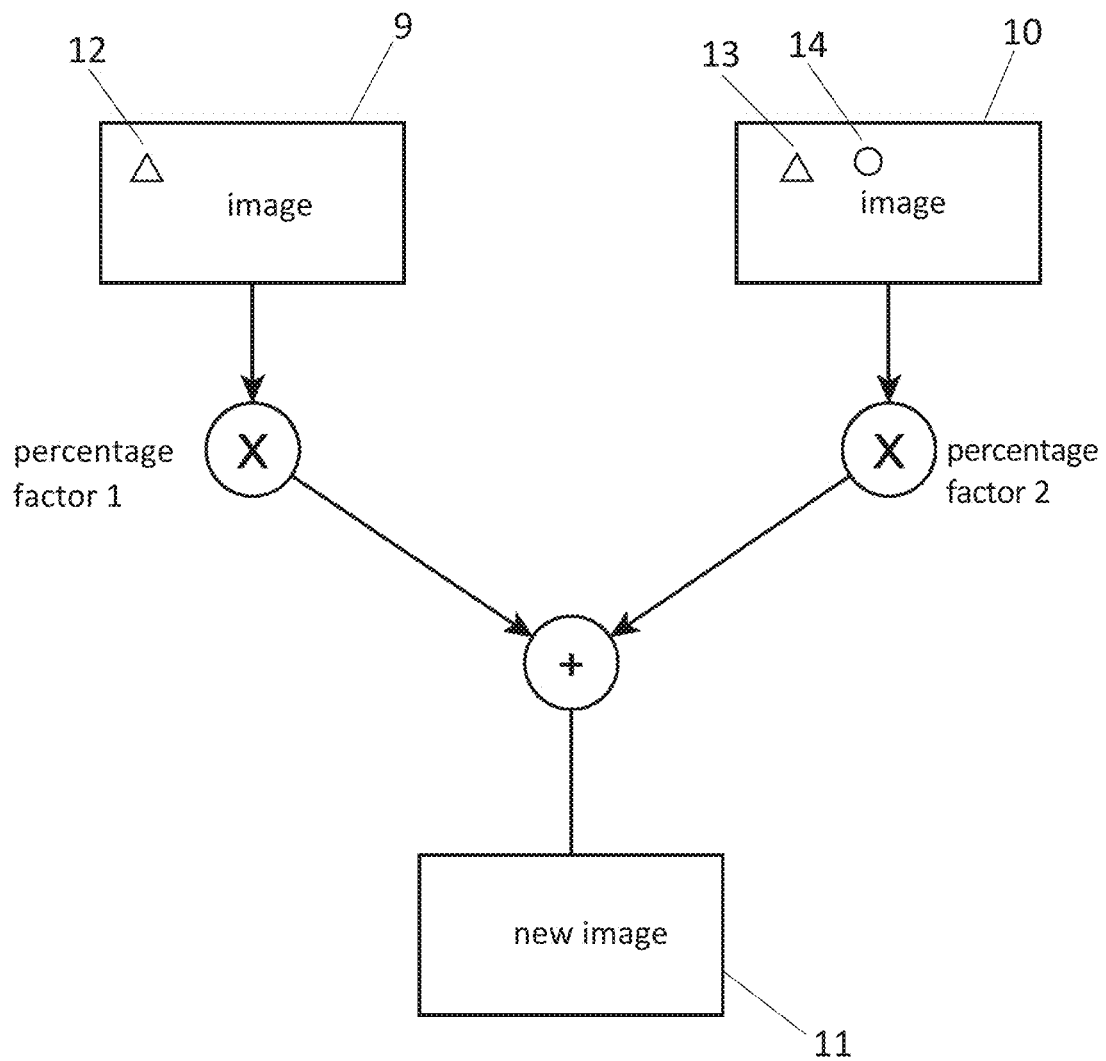
FIG. 2 is a schematic block diagram for explaining the calculation of a new image according to an embodiment of the present invention.

FIG. 2 shows a schematic diagram illustrating the calculation of a new image according to the invention.

The images 9, 10 shown in FIG. 2 are acquired by the at least one image capture device 2 shown in FIG. 1 and stored in the image memory 4 as subsequently acquired images. The image processing device 6 of FIG. 1 takes these images 9, 10 stored in the image memory 4 and multiplies the image 9 by a percentage factor 1. Furthermore, the image processing device 6 multiplies the image 10 by a percentage factor 2. The calculation or determination of the percentage factors is described in more detail later.

Specifically, brightness information and/or color information of each pixel in the image 9 is multiplied by the corresponding percentage factor 1, and each pixel in the image 10 is multiplied by the percentage factor 2. Depending on the frame rate of the image capture device 2 and the image output device 5, the percentage factors 1, 2 may differ from each other. For example, the sum of percentage factor 1 and percentage factor 2 equals 100% and 1, respectively, as described in more detail later.

Figure 9:
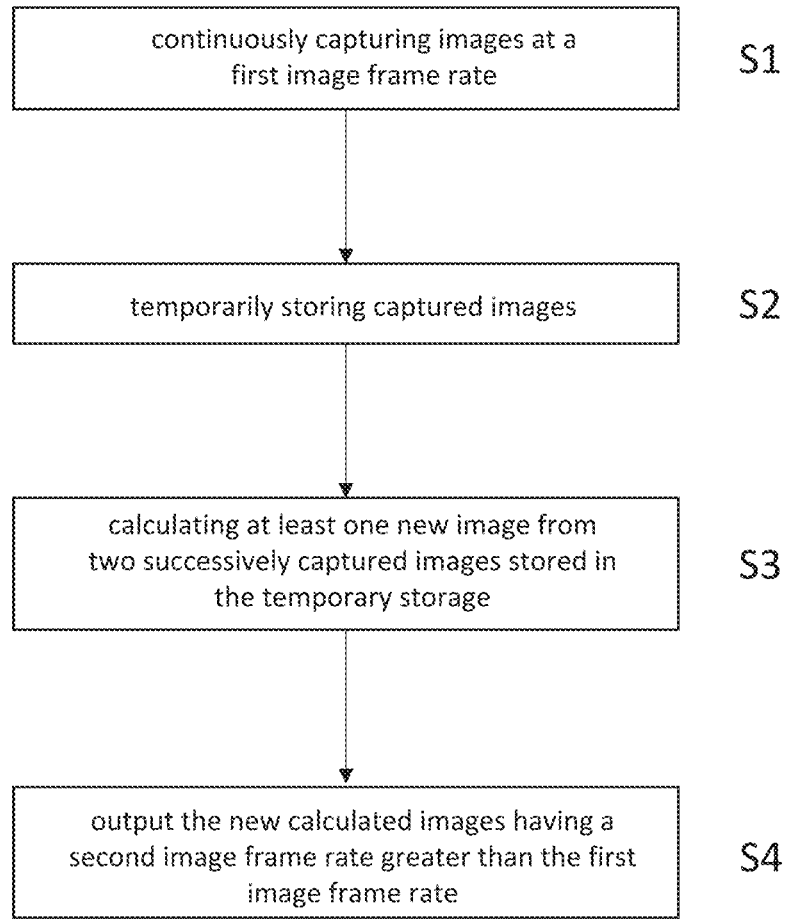
FIG. 9 is a flowchart according to an embodiment of the method according to the present invention.

As shown in FIG. 2, after multiplying each pixel by a corresponding percentage factor, images 9, 10 are summed to produce a new image 11. Specifically, the pixel 12 in image 9 whose brightness and/or color information has been multiplied by the percentage factor 1 and the pixel 13 in image 10 that has been multiplied by the percentage factor 2 are summed. In particular, those pixels in image 9 are added to those in image 10 which are locally located at the same position. For example, as shown in FIG. 2, pixel 12 in FIG. 9 is added to pixel 13, even though pixel 12 would correspond to pixel 14 in FIG. 10 due to a movement of image content. The above process is performed for each single pixel in images 9 and 10 to calculate the new image 11 that is displayed on the image output device 5.

Figure 3:
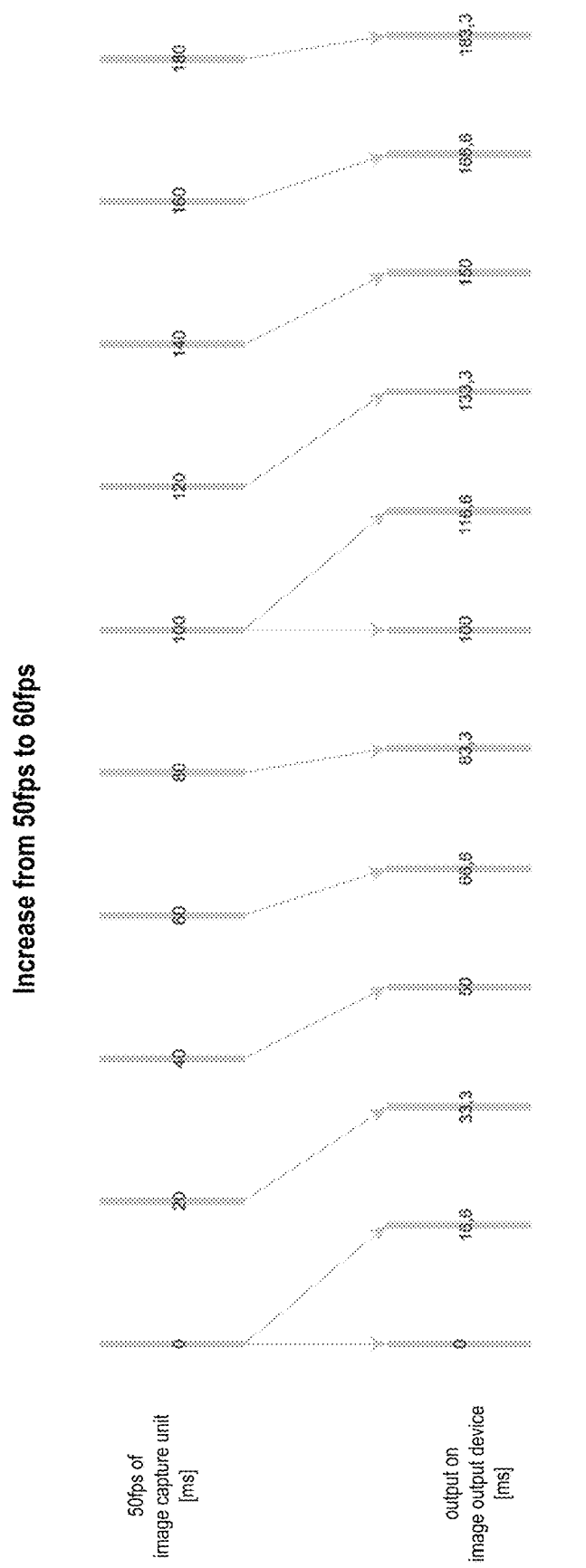
FIG. 3 is a first example of a frame rate increasing according to an embodiment of the prior art.

FIG. 3 shows a first example of increasing the frame rate from 50 fps to 60 fps according to the prior art.

The top row in FIG. 3 shows ten images acquired by the image capture device 2 at an image frame rate of 50 fps at 0, 20, . . . , 180 ms. The bottom row in FIG. 3 shows eleven images output at a frame rate of 60 fps. To increase the frame rate from 50 fps to 60 fps according to the prior art, the image captured at 0 ms is reproduced twice in succession at 0 ms and 16.6 ms. Similarly, the image captured by the image capture device at 100 ms is reproduced twice in succession at 100 ms and 116.6 ms. The images captured at 20 ms, 40 ms, 60 ms, 80 ms, 120 ms, 140 ms, 160 ms, and 180 ms by the image capture device are each output once but time-shifted on the image output device, as shown in FIG. 3, to obtain a frame rate of 60 fps.

In contrast to the present invention, in FIG. 3, no images are recomputed or newly calculated from at least two successive images captured by the image capture device, as described below with reference to FIG. 4.

Figure 4:
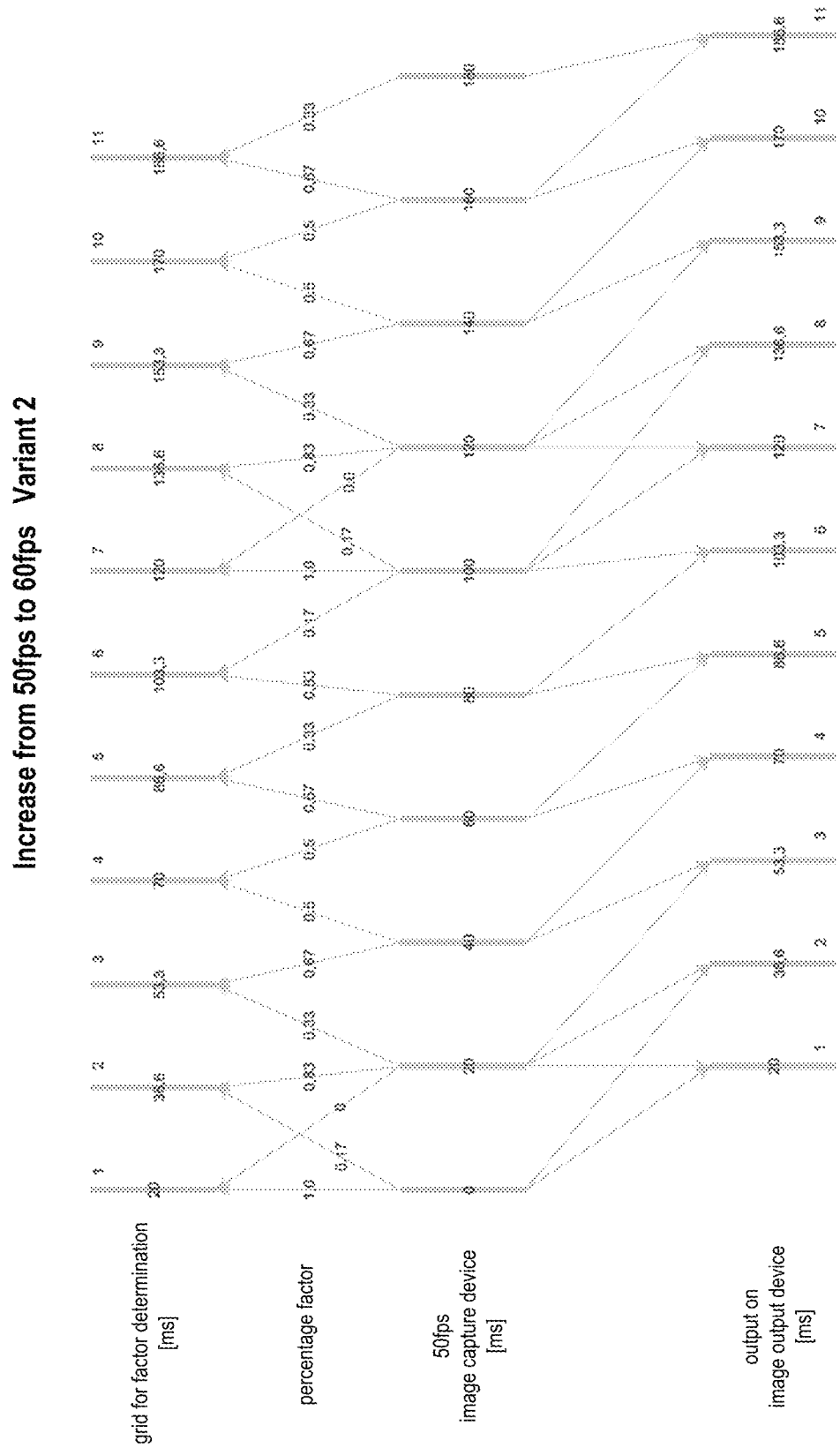
FIG. 4 is a first embodiment of a frame rate increasing according to the invention.

FIG. 4 shows a first embodiment of the invention for increasing a frame rate from 50 fps to 60 fps.

FIG. 4 shows in the middle row, similar to FIG. 3, ten images captured by the image capture device at a frame rate of 50 fps. According to the first embodiment, the image at 0 ms and the image at 20 ms are processed according to the process described in FIG. 2 to form a new image 1 in the top line in FIG. 4 by multiplying the image captured at 0 ms by the percentage factor 1.0, multiplying the image captured at 20 ms by the percentage factor 0.0, and summing the resulting images to form the new image 1. Due to the percentage factors of 0.0 and 1.0, the new calculated image 1 in this case is identical to the image acquired at 0 ms.

As shown in FIG. 4, the new image 1 is output at 20 ms on the image output device 5. As further shown in FIG. 4, the two images taken at 0 ms and 20 ms are further computed into a new image 2, as shown in the top line of FIG. 4. For this purpose, the image acquired at 0 ms is multiplied by the percentage factor 0.17, and the image acquired at 20 ms is multiplied by the percentage factor 0.83. As described in FIG. 2, the resulting images are summed to form the new image 2. The newly calculated image 2 is output at 36.6 ms. Similarly, the image 3 is calculated from the image captured at 20 ms by the image capture device and the subsequent image captured at 40 ms, as shown in the top line in FIG. 4, by multiplying the image captured at 20 ms by the percentage factor 0.33, multiplying the image captured at 40 ms by the percentage factor 0.67, and summing the resulting images to form the new image 3.

The top line in FIG. 4 corresponds to a grid (raster) for determining the percentage factors to convert a frame rate of 50 fps to 60 fps. The grid is predefined in a memory as described above, for example, or is calculated at runtime. The grid changes depending on the frame rate of the image capture device and the frame rate of the image output device, as will become clear later with reference to FIG. 7.

The percentage factors shown in FIG. 4 correspond to the temporal position of the newly calculated image in relation to the temporal position of the at least two successively captured images. I.e. the percentage factors correspond to a kind of weighting of the captured images, which is carried out on the basis of temporal criteria, i.e. on the basis of the temporal relationship or distance between the time of the image to be output and the time of the captured image. For example, the newly generated image 2 in the top line of FIG. 4 is at 36.6 ms, i.e., between the image captured at 20 ms and the image captured at 40 ms in the middle line of FIG. 4. Accordingly, the percentage factor by which the image captured at 20 ms is multiplied is calculated by the temporal distance (36.6 ms-20 ms) divided by the temporal distance of two successive images at 50 fps (20 ms). The percentage factor by which the image captured at 0 ms is multiplied to generate the new image 2 is calculated by the temporal distance between the image captured at 40 ms and the newly generated image 2 (40 ms-36.6 ms) divided by the temporal distance of two successive images at 50 fps (20 ms).

As shown in FIG. 4, in the same way as described above, the percentage factors are determined from the grid for the remaining captured images and used to generate the new images 3 to 11.

As shown in FIG. 4, the newly generated image 1 is output at 20 ms and calculated from the images acquired at 0 ms and 20 ms using the percentage factors 1 and 0 as described above. The newly generated image 2 is output at 36.6 ms and generated from the images acquired at 0 ms and 20 ms with the percentage factors 0.17 and 0.83. The newly generated image 3 is output at 53.3 ms and is generated from the images captured at 20 ms and 40 ms with the percentage factors 0.33 and 0.67. Similarly, the newly generated images 4 to 11 are output on the image output device at a frame rate of 60 fps.

Figure 5:
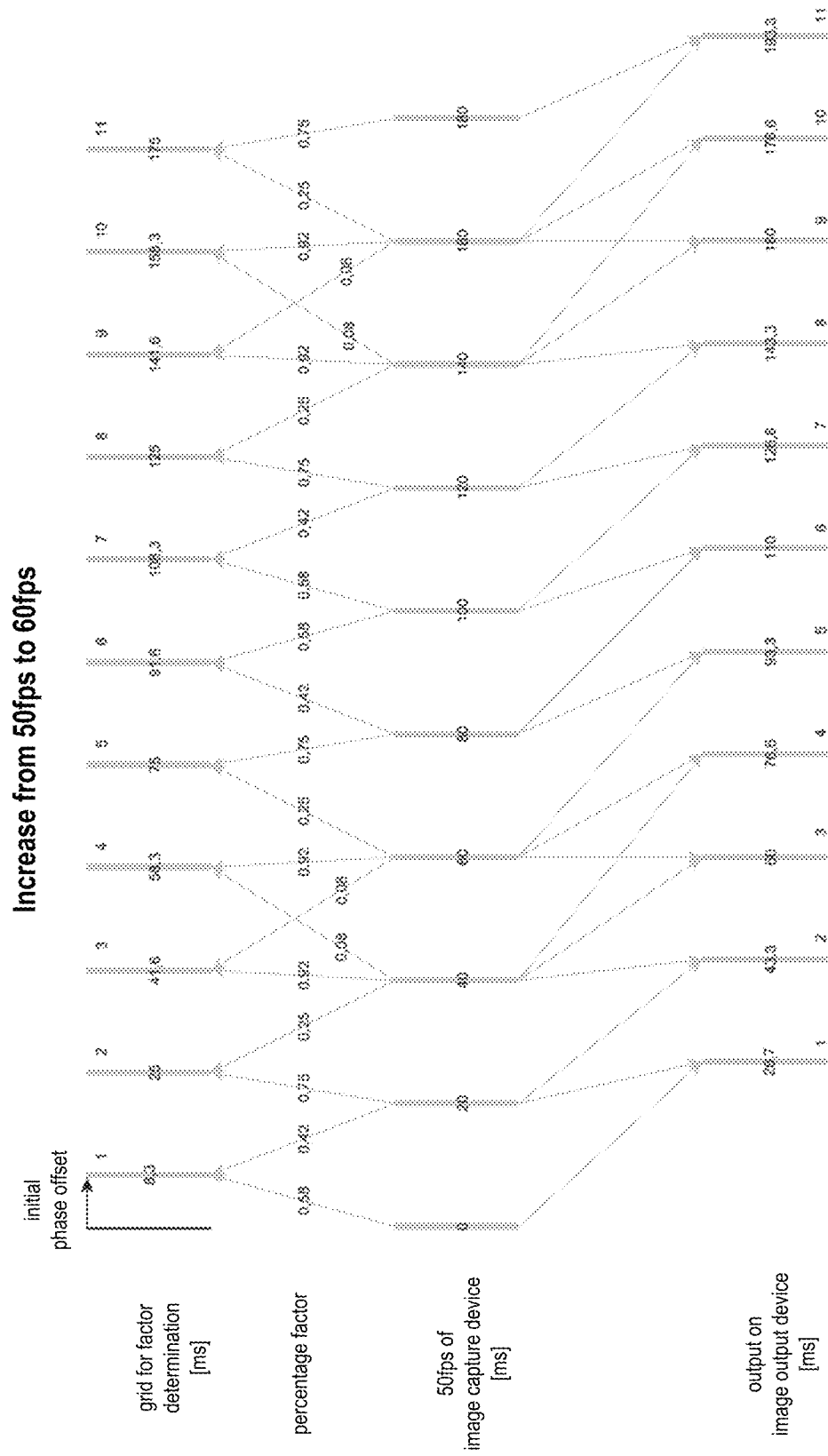
FIG. 5 is a second embodiment of a frame rate increasing according to the invention.

FIG. 5 shows a second embodiment for increasing a frame rate from 50 fps to 60 fps.

The second embodiment differs from the first embodiment in that, in addition, the grid for factor determination comprises an initial phase offset, as shown in FIG. 5. An initial phase shift means that the grid shown in FIG. 4 is shifted in time. According to the second embodiment shown in FIG. 5, the grid of FIG. 4 is shifted to the right in such a way that the first newly generated image is generated at 8.3 ms. The temporal position of 8.3 ms with respect to the temporal position of the images acquired at 0 ms and 20 ms results in the percentage factors 0.58 and 0.42, which are calculated as described above. Similar to FIG. 4, the sum of the percentage factors used to calculate the new image 1 equals 100%. The second embodiment with the initial phase offset has the advantage that as few as possible newly calculated images coincide with the captured images. Referring again to FIG. 4, for example, the recalculated images 1 and 7 output at the 20 ms and 120 ms time points are identical to the images captured at 20 ms and 100 ms. As shown in FIG. 5, due to the phase shift, none of the newly generated images 1 to 11 is identical to any of the captured images.

As shown in FIG. 5, the output new image 1 is calculated from the images taken at 0 ms and 20 ms with the percentage factors 0.58 and 0.42, the newly output new image 2 is calculated from the images taken or captured at 20 ms and 40 ms with the percentage factors 0.75 and 0.25, the newly output image 3 is calculated from the images taken at 40 ms and 60 ms with the percentage factors 0.92 and 0, 08, the newly output image 4 is calculated from the images acquired at 40 ms and 60 ms with the percentage factors 0.08 and 0.92, the new image 5 is calculated from the images taken at 60 ms and 80 ms with the percentage factors 0.25 and 0.75, and so on.

Figure 6:
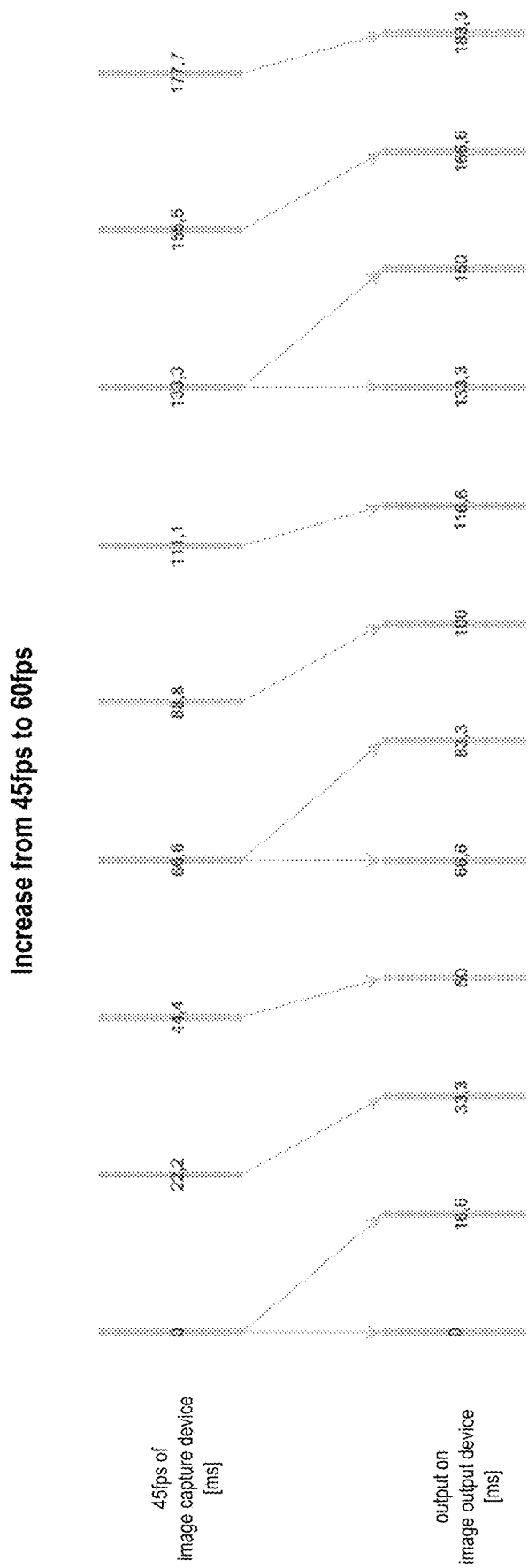
FIG. 6 is a second example of a frame rate increasing according to the prior art.

FIG. 6 shows a second example of increasing a frame rate from 45 fps to 60 fps according to the prior art.

The top line of FIG. 6 shows nine images captured by the image capture device at 45 fps. The bottom line in FIG. 6 shows the output on the image output device at 60 fps. An increase from 45 fps to 60 fps is achieved according to the second example of the prior art by reproducing the images recorded at 0 ms, 66.6 ms and 133.3 ms twice in succession. For example, the image recorded at 0 ms is reproduced twice at 0 ms and 16.6 ms, the image recorded at 66.6 ms is reproduced at 66.6 ms and 83.3 ms, and the image recorded at 133.3 ms is reproduced at 133.3 ms and at 150 ms to obtain a frame rate increase from 45 fps to 60 fps.

Figure 7:
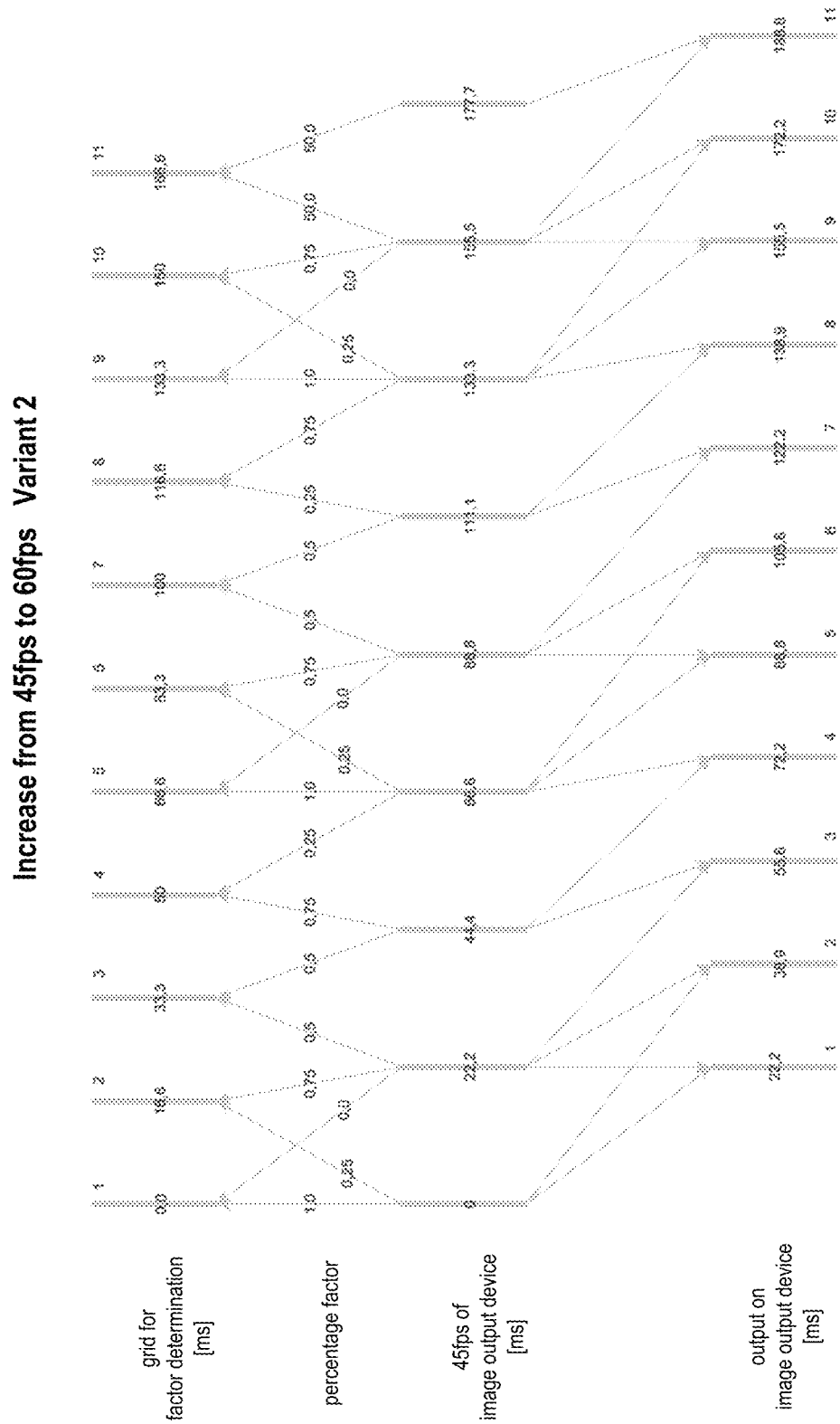
FIG. 7 is a third embodiment of a frame rate increasing according to the present invention.

In contrast, FIG. 7 shows a third embodiment of increasing a frame rate from 45 fps to 60 fps according to the invention. Similar to the first embodiment of FIG. 4, the frame rate increase from 45 fps to 60 fps does not use a phase shift. As shown in FIG. 7, the grid in the top row of FIG. 7 differs from the grid for factor determination in FIG. 4 in that the temporal intervals between the newly generated images are different. This results from the fact that according to the third embodiment, there is a frame rate increase from 45 fps to 60 fps, instead of from 50 fps to 60 fps.

The calculation of the percentage factors, the generation of the new images using the percentage factors, and the corresponding output of the newly generated images are performed in a similar manner as described above for the first embodiment and will not be repeated.

Figure 8:
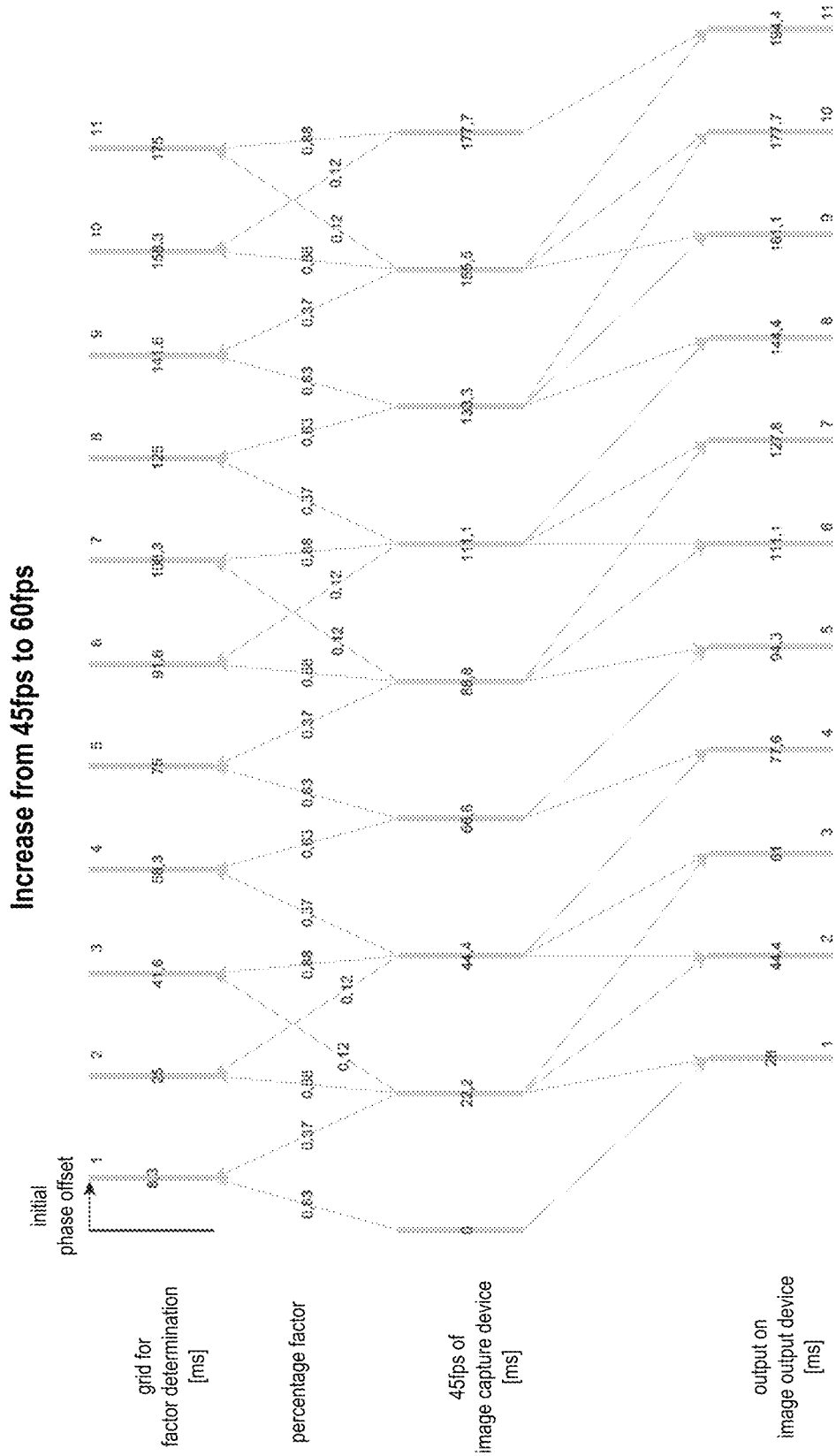
FIG. 8 is a fourth embodiment of a frame rate increasing according to the invention.

FIG. 8 shows a fourth embodiment of increasing a frame rate from 45 fps to 60 fps according to the invention. The fourth embodiment differs from the third embodiment in that an initial phase offset is used similar to the second embodiment.

As described above and as can be clearly seen from FIGS. 4, 5 and 7, 8, the sum of the percentage factors for calculating a new image is respectively 100% and 1. In the case where image brightening is desired, the percentage factors may be increased such that the sum is greater than 100%. In the case of image darkening, the sum can be less than 100%.

FIG. 9 shows a flowchart according to the invention for matching an image frame rate of an image sensor of an image capture device to the image frame rate of an image output device.

In step S1, images are continuously captured at a first frame rate (frame rate of the image sensor). In step S2, the captured images are stored in a buffer memory. In step S3, at least one new image is calculated from two successively captured images stored in the buffer. Step S3 is described in more detail with reference to FIG. 10. In step S4, each newly calculated image is output at a frame rate that matches the frame rate of the image output device.

Figure 10:
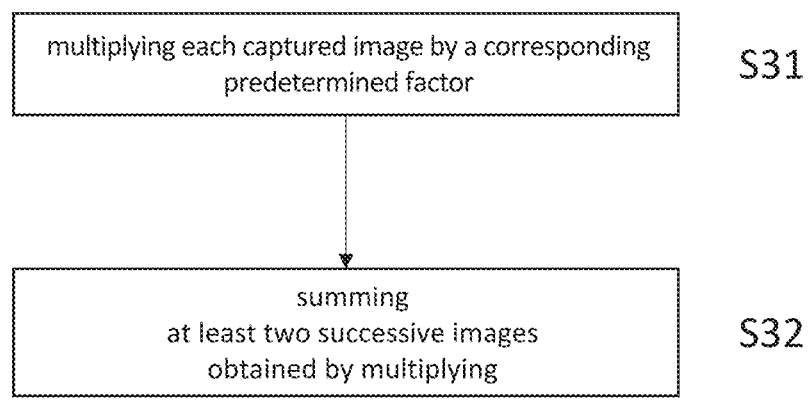
FIG. 10 is a flowchart for illustrating the calculation of a new image according to the invention.

FIG. 10 shows a flowchart that illustrates step S3 shown in FIG. 9 in more detail.

In S31, to generate a new image, each captured image is multiplied by a respective predetermined percentage factor, which is determined as described above. In step S32, a summation of at least two successive images obtained by the multiplication is performed. In this respect, reference is also made to the above description of FIG. 2.

It is explicitly emphasized that all features disclosed in the description and/or claims are to be considered separate and independent from each other for the purpose of the original disclosure as well as for the purpose of limiting the claimed invention independently of the combinations of features in the embodiments and/or claims. It is explicitly stated that all range indications or indications of groups of units disclose any possible intermediate value or subgroup of units for the purpose of the original disclosure as well as for the purpose of limiting the claimed invention, in particular also as a limit of a range indication.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An indirect viewing system for a vehicle, comprising:
at least one image capture device having an image sensor for continuously capturing images at a first frame rate;
an image memory which temporarily stores images for processing which is temporally subsequent to the capturing of the images;
an image processing device that continuously calculates at least one new image from at least two successively captured images, the calculated new images having a second frame rate different from the first frame rate; and
an image output device for outputting the continuously calculated new images at the second frame rate, wherein each of the continuously calculated new images is formed by summing at least two successive images each multiplied by a percentage factor, wherein the percentage factor changes continuously for the continuously calculated new images according to a temporal position of the calculated new image with respect to temporal positions of the at least two successively captured images.

2. The system according to claim 1, wherein brightness information and color information of each pixel in a captured image are multiplied separately or combined by the corresponding percentage factor, and respective corresponding pixels in the at least two successively captured images are summed to generate the new image.

3. The system according to claim 1, wherein brightness information and color information of raw data of the image sensor is multiplied separately or combined by the corresponding percentage factor and summed in the at least two successively captured images to generate the new image.

4. The system according to claim 1, wherein the percentage factors depend on the frame rate of the image capture device and the frame rate of the image output device.

5. The system according to claim 4, wherein the percentage factors additionally depend on an initial phase offset between the first and second frame rates.

6. The system according to claim 1, wherein the percentage factors are stored as constants in the image processing device or are calculated by the image processing device at runtime.

7. The system according to claim 1, wherein the sum of the percentage factors is 100%.

8. The system according to claim 1, wherein the frame rate of the image capture device and the frame rate of the image output device are static and do not change during operation of the system, or the frame rate of the image capture device changes dynamically depending on vehicle conditions, vehicle signals, manual input by a user, and/or signals from a brightness sensor of the image capture device and/or signals from a brightness sensor of the image output device.

9. The system according to claim 1, wherein the image processing device is integrated in the image capture device or in the image output device and/or the image memory is integrated in the image processing device.

10. A method of increasing an image frame rate, comprising the steps of:
continuously capturing images at a frame rate of an image sensor of an image capture device;
buffering the captured images for processing subsequent in time to the capture of the images;
continuously calculating at least one new image from at least two successively captured images by forming a sum of at least two successive images each multiplied by a percentage factor corresponding to a temporal location of the calculated new image with respect to temporal locations of the corresponding one of the at least two successively captured images, the calculated new images having an image frame rate of an image output device; and
outputting the continuously calculated new images at the frame rate of the image output device.

11. The method of claim 10, further comprising:
multiplying brightness information and color information of each pixel in a captured image separately or combined by the corresponding percentage factor, and then summing respective corresponding pixels in the at least two successively captured images to generate the new image.

12. The method of claim 10, further comprising:
multiplying brightness information and color information of raw data of the image sensor separately or combined by the corresponding percentage factor, and then summing the respective corresponding results in the at least two successively captured images to generate the new image.

13. The method of claim 10, wherein the percentage factors depend on the image frame rate of the image capturing device and the image frame rate of the image output device.

14. The method of claim 13, wherein the percentage factors additionally depend on an initial phase offset between the first and second frame rates.

15. The method of claim 10, further comprising:
storing the percentage factors as constants in the image processing device, or calculating the percentage factors at runtime by the image processing device.

16. The method of claim 10, wherein the sum of the percentage factors is 100%.

17. The method of claim 10, wherein the frame rate of the image capture device and the frame rate of the image output device are static and do not change during operation of the system, or the frame rate of the image capture device changes dynamically depending on vehicle conditions, vehicle signals, manual input by a user, and/or signals from a brightness sensor of the image capture device and/or signals from a brightness sensor of the image output device.

18. The method of claim 10, wherein the image processing device is integrated in the image capture device or in the image output device, and/or the image memory is integrated in the image processing device.

\* \* \* \* \*